United States Patent
Mochizuki

(10) Patent No.: US 10,462,401 B2
(45) Date of Patent: Oct. 29, 2019

(54) ENCODING APPARATUS AND ENCODING METHOD ENCODING RAW DATA THAT IS QUANTIZED BASED ON AN INDEX VALUE OF NOISE AMOUNT IN AN OPTICAL BLACK AREA

(71) Applicant: CANON KABUSHIKI KAISHA, Tokyo (JP)

(72) Inventor: Shigeki Mochizuki, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 177 days.

(21) Appl. No.: 15/604,371

(22) Filed: May 24, 2017

(65) Prior Publication Data
US 2017/0353681 A1  Dec. 7, 2017

(30) Foreign Application Priority Data
Jun. 1, 2016 (JP) ................. 2016-110222

(51) Int. Cl.
| | |
|---|---|
| G06K 9/46 | (2006.01) |
| H04N 5/367 | (2011.01) |
| G06K 9/38 | (2006.01) |
| G06K 9/52 | (2006.01) |
| H04N 5/361 | (2011.01) |
| H04N 9/07 | (2006.01) |
| G06K 9/40 | (2006.01) |

(52) U.S. Cl.
CPC ............ *H04N 5/3675* (2013.01); *G06K 9/38* (2013.01); *G06K 9/40* (2013.01); *G06K 9/52* (2013.01); *G06K 9/522* (2013.01); *H04N 5/361* (2013.01); *H04N 9/07* (2013.01)

(58) Field of Classification Search
CPC .. H04N 19/124; H04N 19/115; H04N 19/149; H04N 19/196; H04N 19/146; H04N 19/91; G06T 7/11
See application file for complete search history.

(56) References Cited

U.S. PATENT DOCUMENTS

| | | | | |
|---|---|---|---|---|
| 5,724,097 A | * | 3/1998 | Hibi ............... | H04N 19/176 375/240.04 |
| 2006/0132618 A1 | * | 6/2006 | Fujita ............... | H04N 1/2112 348/222.1 |
| 2014/0286644 A1 | * | 9/2014 | Oshima ............... | H04B 10/11 398/118 |
| 2016/0021379 A1 | * | 1/2016 | Minezawa ........... | H04N 19/463 375/240.13 |

FOREIGN PATENT DOCUMENTS

JP   2003-179926   6/2003

* cited by examiner

*Primary Examiner* — Jayesh A Patel
(74) *Attorney, Agent, or Firm* — Venable LLP

(57) ABSTRACT

There is provided an encoding apparatus. An acquiring unit acquires an index value of a noise amount by analyzing at least a part of an optical black area that is included in raw data. A quantizing unit quantizes the raw data based on the index value. An encoding unit encodes the quantized raw data. If the index value is a first value, the quantizing unit quantizes the raw data with a first quantization step. If the index value is a second value corresponding to a larger noise amount than a noise amount in a case where the index value is the first value, the quantizing unit quantizes the raw data with a second quantization step that is larger than the first quantization step.

14 Claims, 8 Drawing Sheets

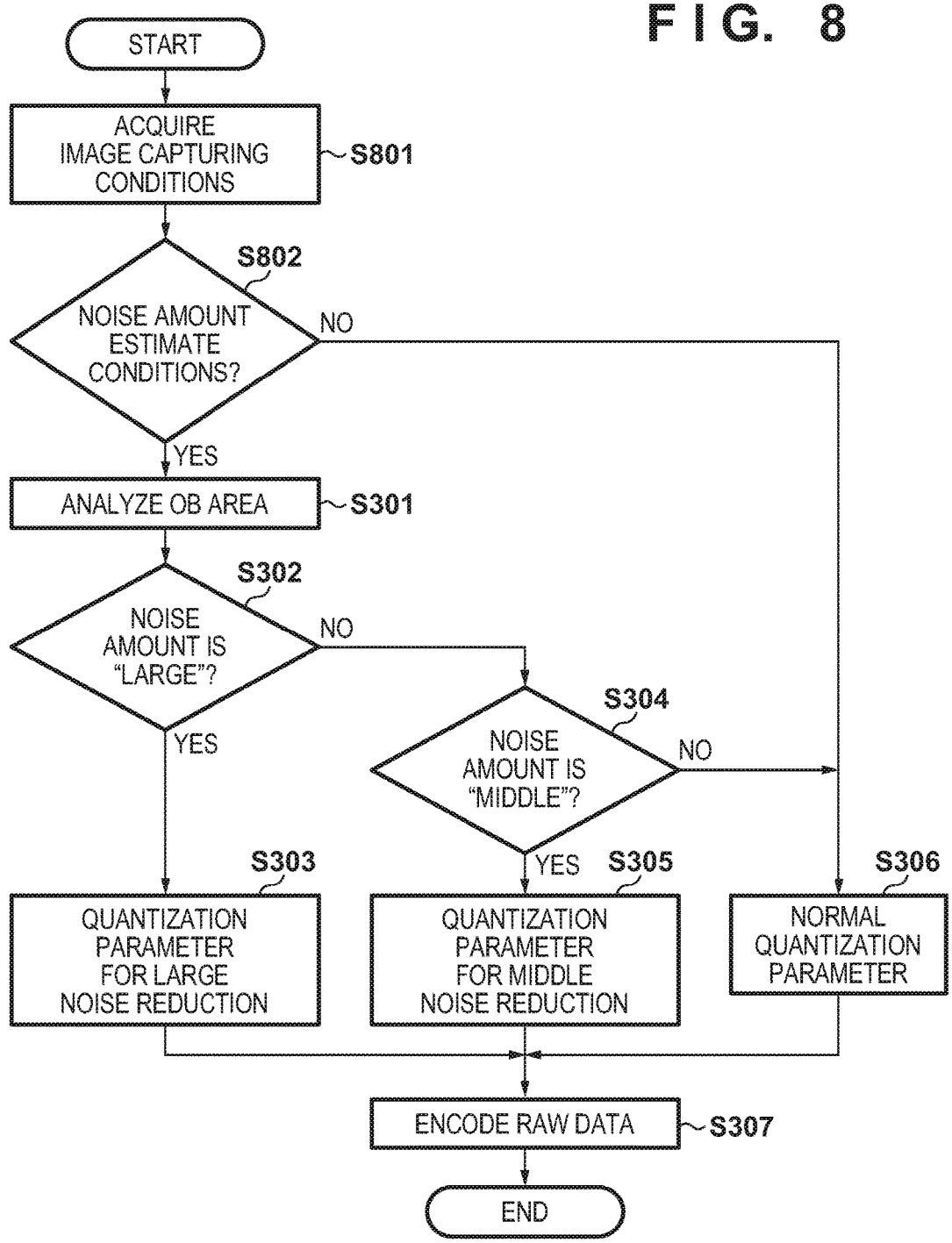

ENCODING APPARATUS AND ENCODING METHOD ENCODING RAW DATA THAT IS QUANTIZED BASED ON AN INDEX VALUE OF NOISE AMOUNT IN AN OPTICAL BLACK AREA

BACKGROUND OF THE INVENTION

Field of the Invention

The present invention relates to an encoding apparatus, an encoding method, and a storage medium.

Description of the Related Art

Currently, image capturing apparatuses such as digital still cameras and digital video cameras are widespread and commonly used. These image capturing apparatuses generate digital image data by converting light received by an image sensor, such as a CCD or CMOS sensor, into digital signals. In the process of generating digital image data, dark current noise, thermal noise, shot noise, or the like occurs due to characteristics or the like of the image sensor or circuits, and random noise mixes with digital image data.

The pixel pitch has been significantly decreased with a recent decrease in the size of image sensors and increase in the number of pixels, making random noise more noticeable. In particular, random noise occurs significantly when image capturing sensitivity is increased, for example. Thus, to achieve image quality enhancement, removal of random noise is essential. For example, Japanese Patent Laid-Open No. 2003-179926 proposes a technique of suppressing high-frequency noise components by selectively switching a quantization table in accordance with image capturing conditions, such as image capturing sensitivity, to encode image data.

Noise that occurs when capturing an image varies due to combinations of complex factors such as characteristics of the image sensor and temperature conditions, and there is, accordingly, a limit of the accuracy of noise-amount estimation based on the image capturing conditions.

SUMMARY OF THE INVENTION

The present invention was made in view of the foregoing situation, and provides a technique for estimating a noise amount in a captured image with high accuracy, thereby suppressing noise.

According to a first aspect of the present invention, there is provided an encoding apparatus comprising: an acquiring unit configured to acquire an index value of a noise amount by analyzing at least a part of an optical black area that is included in raw data; a quantizing unit configured to quantize the raw data based on the index value; and an encoding unit configured to encode the quantized raw data, wherein if the index value is a first value, the quantizing unit quantizes the raw data with a first quantization step, and if the index value is a second value corresponding to a larger noise amount than a noise amount in a case where the index value is the first value, the quantizing unit quantizes the raw data with a second quantization step that is larger than the first quantization step.

According to a second aspect of the present invention, there is provided an encoding method comprising: acquiring an index value of a noise amount by analyzing at least a part of an optical black area that is included in raw data; quantizing the raw data based on the index value; and encoding the quantized raw data, wherein if the index value is a first value, the raw data is quantized with a first quantization step in the quantizing, and if the index value is a second value corresponding to a larger noise amount than a noise amount in a case where the index value is the first value, the raw data is quantized with a second quantization step that is larger than the first quantization step in the quantizing.

According to a third aspect of the present invention, there is provided a non-transitory computer-readable storage medium which stores a program for causing a computer to execute an encoding method comprising: acquiring an index value of a noise amount by analyzing at least a part of an optical black area that is included in raw data; quantizing the raw data based on the index value; and encoding the quantized raw data, wherein if the index value is a first value, the raw data is quantized with a first quantization step in the quantizing, and if the index value is a second value corresponding to a larger noise amount than a noise amount in a case where the index value is the first value, the raw data is quantized with a second quantization step that is larger than the first quantization step in the quantizing.

Further features of the present invention will become apparent from the following description of exemplary embodiments with reference to the attached drawings.

BRIEF DESCRIPTION OF THE DRAWINGS

FIG. 8 is a flowchart of encoding processing executed by the image capturing apparatus 100 according to a third embodiment.

DESCRIPTION OF THE EMBODIMENTS

Embodiments of the present invention will now be described with reference to the attached drawings. It should be noted that the technical scope of the present invention is defined by the claims, and is not limited by any of the embodiments described below. In addition, not all combinations of the features described in the embodiments are necessarily required for realizing the present invention.

First Embodiment

Figure 1:
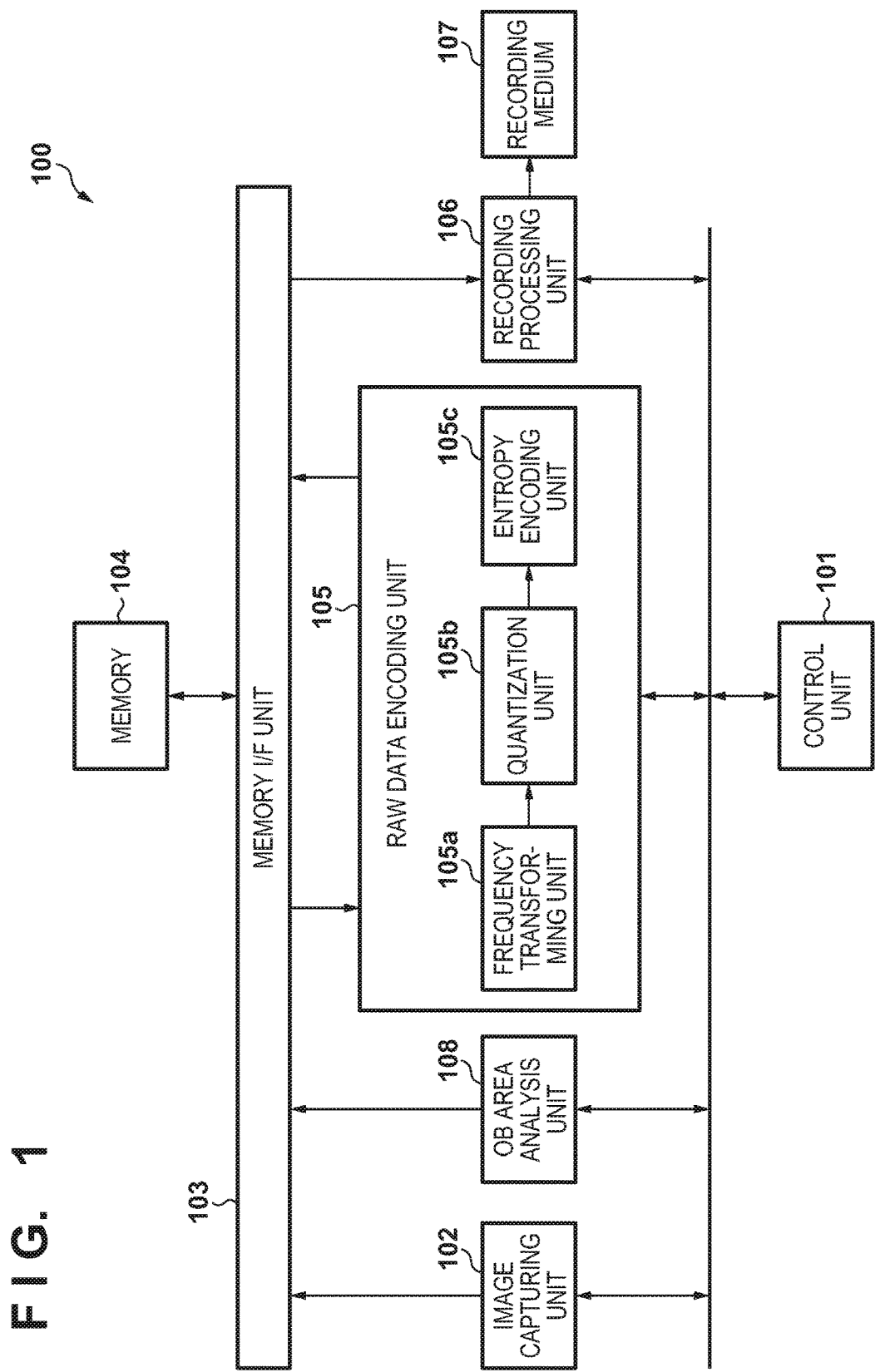
FIG. 1 is a block diagram showing a configuration of an image capturing apparatus 100 that includes an encoding apparatus.

FIG. 1 is a block diagram showing a configuration of an image capturing apparatus 100 that includes an encoding apparatus. In FIG. 1, a control unit 101 controls each unit in the image capturing apparatus 100. The image capturing unit 102 includes a lens optical system capable of optical zoom, and an image sensor, such as a CCD image sensor or a CMOS image sensor, for converting optical information from the lens optical system into electrical signals. The lens optical system includes optical lenses, a diaphragm, focus control unit, and a lens driving unit. An image capturing unit 102 writes, to a memory 104, raw data that is obtained by converting the electrical signals obtained by the image sensor into digital signals.

Figure 2:
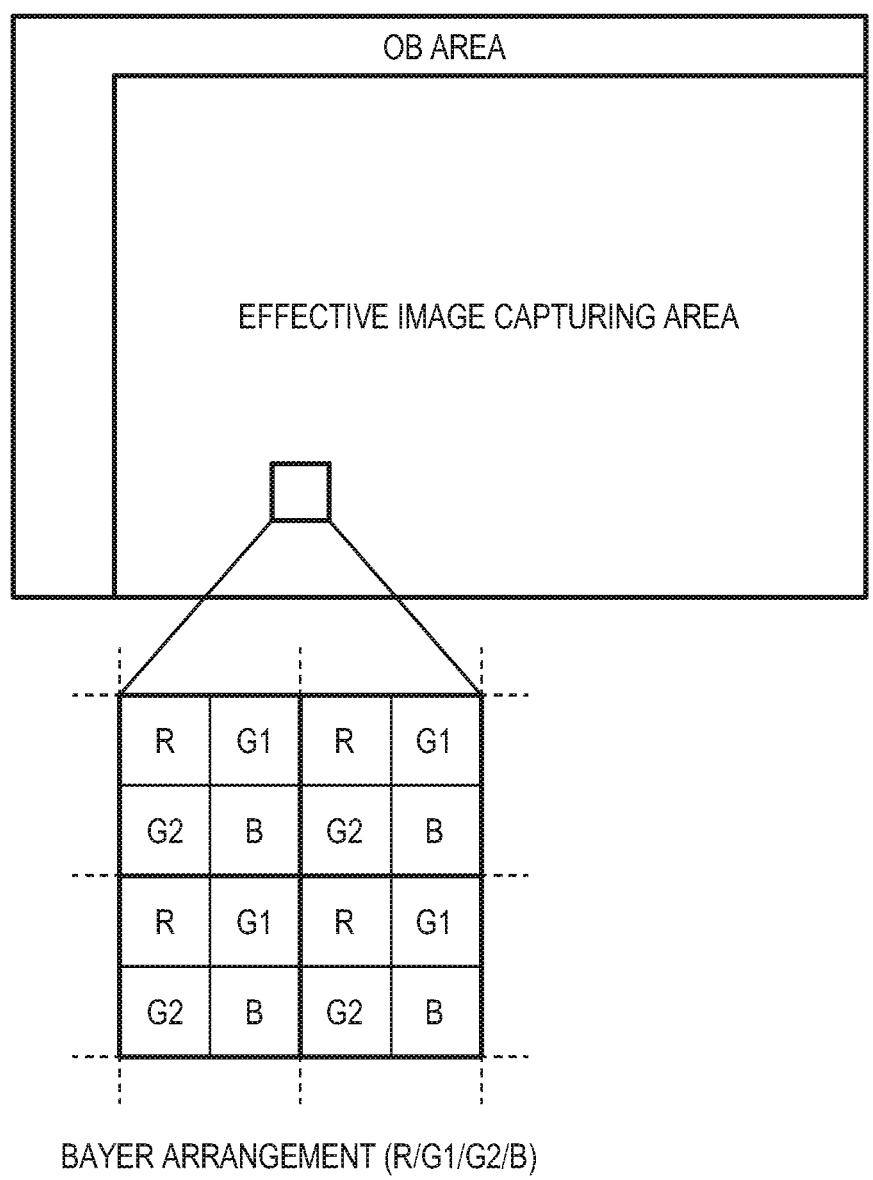
FIG. 2 is a conceptual diagram of raw data.

Here, the raw data is constituted by an effective image capturing area, which is a light-receiving pixel area, and an optical black area (OB area), which is a light-shielded pixel area, as shown in FIG. 2. In the example in FIG. 2, the raw data is constituted by four color elements that are R (red), G1 (green), G2 (green), and B (blue) in a Bayer arrangement, but the type of color elements and arrangement thereof is not limited to this configuration, and other configurations may be employed.

A memory I/F unit 103 mediates memory access requests from the units in the image capturing apparatus 100, and controls reading from/writing to the memory 104. The memory 104 is a storage area constituted by a volatile memory, for example, for storing various data output from the units in the image capturing apparatus 100.

A raw data encoding unit 105, which includes a frequency transforming unit 105a, a quantization unit 105b, and an entropy encoding unit 105c, encodes the raw data using these units. Specifically, the raw data encoding unit 105 reads out the raw data stored in the memory 104, and uses the frequency transforming unit 105a to perform frequency transform processing using discrete cosine transform, discrete wavelet transform, or the like. Thus, the raw data is transformed into frequency domain data (transform coefficient). Next, the raw data encoding unit 105 uses the quantization unit 105b to perform quantization processing on the transform coefficient. Thereafter, the raw data encoding unit 105 uses the entropy encoding unit 105c to perform entropy encoding using Huffman encoding, arithmetic encoding, or the like, on the quantized transform coefficient. Regarding frequency transform processing and entropy encoding, methods other than the aforementioned exemplary methods may be used. The raw data encoding unit 105 writes, to the memory 104, encoded data generated through the above-described encoding.

A recording processing unit 106 reads out the encoded data stored in the memory 104, and converts the read encoded data into data in a given recording format to record the encoded data in a recording medium 107. The recording medium 107 is constituted by a nonvolatile memory, for example.

An OB area analysis unit 108 (optical black area analysis unit) analyzes the OB area, which was described above with reference to FIG. 2. Part of analysis processing is executed by the raw data encoding unit 105 in some cases. The details of analysis processing will be described later.

Here, it is conceivable that characteristics of noise that mixes with the raw data dependently of image capturing conditions such as ISO speed are the same in the effective image capturing area and the OB area. For this reason, the image capturing apparatus 100 estimates the amount of noise included in the raw data by analyzing the OB area, and performs encoding using a quantization parameter corresponding to the estimated noise amount, thereby suppressing noise.

Figure 3:
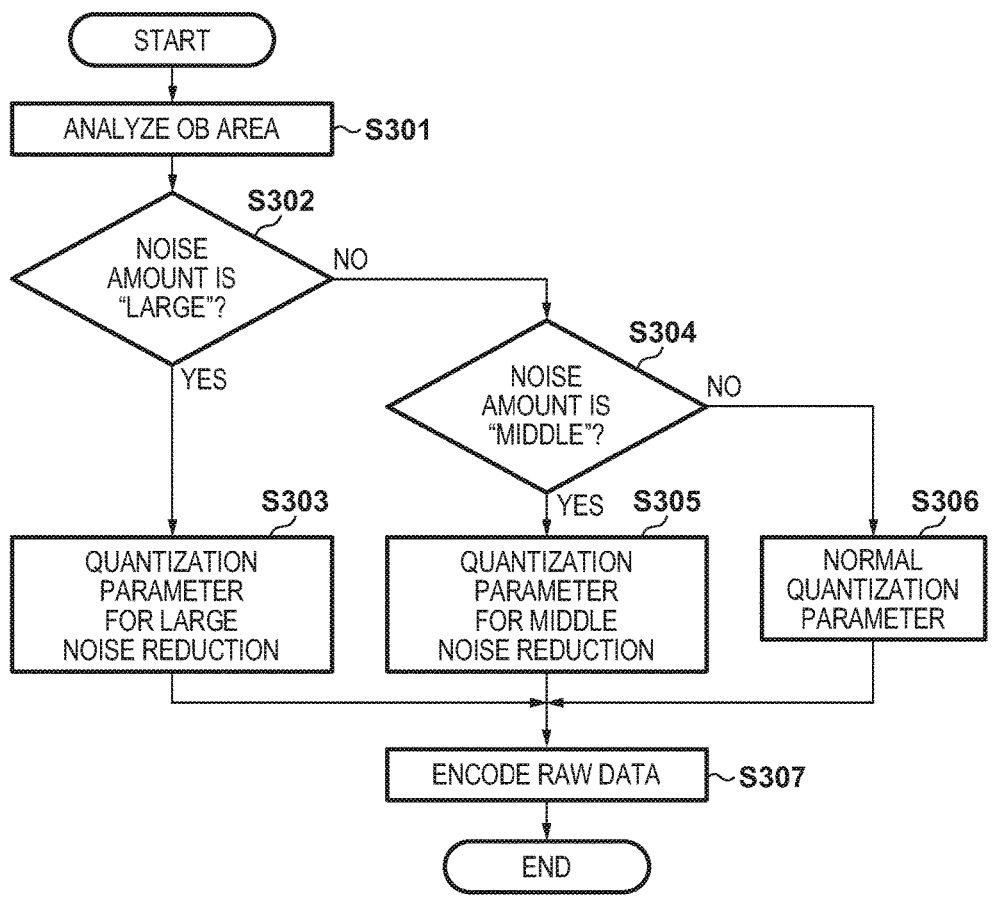
FIG. 3 is a flowchart of encoding processing executed by the image capturing apparatus 100 according to a first embodiment.

FIG. 3 is a flowchart of encoding processing executed by the image capturing apparatus 100. Processing in each step of this flowchart is realized as a result of the control unit 101 executing a control program, unless otherwise stated. Upon an image of an object being captured by the image capturing unit 102 and raw data being generated, processing of this flowchart starts.

In step S301, the OB area analysis unit 108 analyzes the OB area in the raw data. Here, the OB area analysis unit 108 causes the raw data encoding unit 105 to encode a part of or the entire OB area using a given quantization parameter (e.g. a normal quantization parameter that will be mentioned later in step S306), and acquires the amount of generated code.

In step S302, the control unit 101 determines whether or not the noise amount is "large" based on the amount of generated code acquired in step S301. If it is determined that the noise amount is "large", the control unit 101 advances the processing to step S303, and sets a quantization parameter for large noise reduction for the raw data encoding unit 105.

If it is not determined in step S302 that the noise amount is "large", the control unit 101 advances the processing to step S304, and determines whether the noise amount is "middle" based on the amount of generated code acquired in step S301. If it is determined that the noise amount is "middle", the control unit 101 advances the processing to step S305, and sets a quantization parameter for middle noise reduction for the raw data encoding unit 105.

If it is not determined in step S304 that the noise amount is "middle", the control unit 101 advances the processing to step S306, and sets the normal quantization parameter for the raw data encoding unit 105.

In step S307, the raw data encoding unit 105 encodes the raw data using the quantization parameter that was set in step S303, S305, or S306. In the case where the quantization parameter for middle noise reduction is used in this encoding, high-frequency components of the raw data are quantized with a greater quantization step than in the case of using the normal quantization parameter. Similarly, in the case where the quantization parameter for large noise reduction is used, high-frequency components of the raw data are quantized with a greater quantization step than in the case of using the quantization parameter for middle noise reduction. Thus, high-frequency components of the raw data are quantized with a quantization step corresponding to the amount of generated code in the OB area that serves as an index value of the noise amount, and the noise is appropriately suppressed. Note that, although the quantization step for low-frequency components is not particularly limited, for example, all of the quantization parameter for large noise reduction, the quantization parameter for middle noise reduction, and the normal quantization parameter may correspond to the same quantization step. That is to say, quantization may be performed with the same quantization step regardless of the index value of the noise amount.

Figure 4:
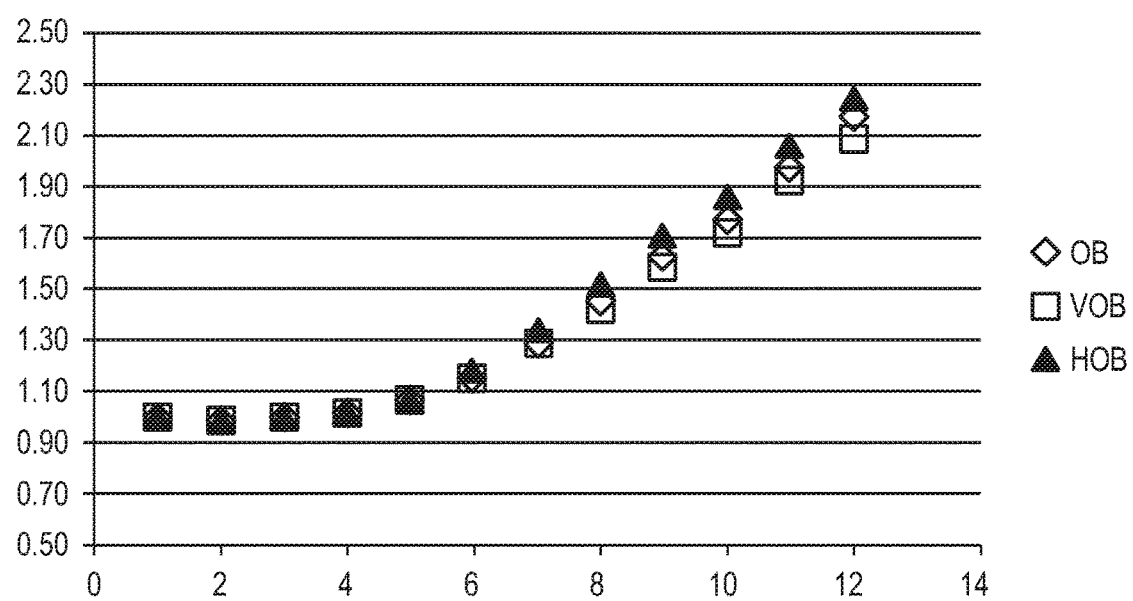
FIG. 4 is a graph depicting a relationship between ISO speed and the amount of generated code in an OB area.

Here, a method for determining the quantization parameter (determination criteria in steps S302 and S304 in FIG. 3) will be described in detail using an example of actual raw data. FIG. 4 is a graph depicting a relationship between ISO speed and the amount of generated code in the OB area with respect to raw data obtained by capturing images while changing the ISO speed from 100 to 204800 step-by-step at the same scene.

In FIG. 4, the horizontal axis indicates the step of ISO speed, where "1" corresponds to "ISO speed=100", the value of ISO speed doubles at every step onward, and "12" corresponds to "ISO speed=204800". The vertical axis indicates the ratio of the amount of generated code in the case where the amount of generated code at the time when ISO speed=100 is assumed to be 1. "OB" denotes the amount of generated code in the entire OB area, "VOB" denotes the amount of generated code in a vertical OB area (see VOB area 702 in FIG. 7), and "HOB" denotes the amount of generated code in a horizontal OB area (see HOB area 701 in FIG. 7). "OB", "VOB", and "HOB" are all depicted while assuming the amount of generated code at the time when ISO speed=100 to be 1.

In the example in FIG. 4, the amount of generated code in the OB area is roughly constant when the ISO speed is 100 to 400, and increases roughly as a linear function when the ISO speed is 800 or higher. This indicates that the amount of generated code increases in association with the amount of noise included in the OB area. For this reason, in the flowchart in FIG. 3, the amount of generated code that is 1.5 times the amount of generated code corresponding to ISO speed=100 or greater indicates a "large" noise amount, and the amount of generated code that is 1.2 times or greater indicates a "middle" noise amount, for example. In the case of the OB area shown in FIG. 4, an ISO speed of 25600 or higher corresponds to a "large" noise amount, an ISO speed of 6400 or higher and lower than 25600 corresponds to a "middle" noise amount, and an ISO speed lower than 6400 corresponds to a "small" noise amount.

Also, as shown in FIG. 4, changes in the amount of generated code in the VOB area and the HOB area corresponding to the ISO speed have substantially the same tendency as that in the OB area. Accordingly, the image capturing apparatus 100 may use the amount of generated code in the VOB area or the HOB area, in place of the amount of generated code in the OB area, as the index value of the noise amount. In this case, the processing load in OB area analysis in step S301 in FIG. 3 is reduced compared with the case of encoding the entire OB area to acquire the amount of generated code. Also, the image capturing apparatus 100 may use the amount of generated code in a partial area in the OB area as the index value of the noise amount. The position and size of this partial area are not particularly limited, and may be determined as appropriate in accordance with the required accuracy level of the noise amount determination.

Here, the index value of the noise amount is not limited to the amount of generated code in the OB area, and the image capturing apparatus 100 may use any information as long as the information has the nature of the index value of the noise amount. That is to say, OB area analysis processing in step S301 in FIG. 3 may be any analysis processing as long as the noise amount can be estimated.

A description will be given below of the case of using variation (variance, standard deviation etc.) of pixel values in the OB area as another example of the index value of the noise amount. In this case, in step S301 in FIG. 3, the OB area analysis unit 108 calculates a variance that is based on Equation 1 below, or calculates a standard deviation that is based on Equation 2 below, with respect to the pixel values in the OB area.

$$\sigma^2 = \frac{1}{n}\sum_{i=1}^{n}(x_i - \mu)^2 \quad \text{Equation 1}$$

$$\sigma = \sqrt{\frac{1}{n}\sum_{i=1}^{n}(x_i - \mu)^2} \quad \text{Equation 2}$$

Figure 5A:
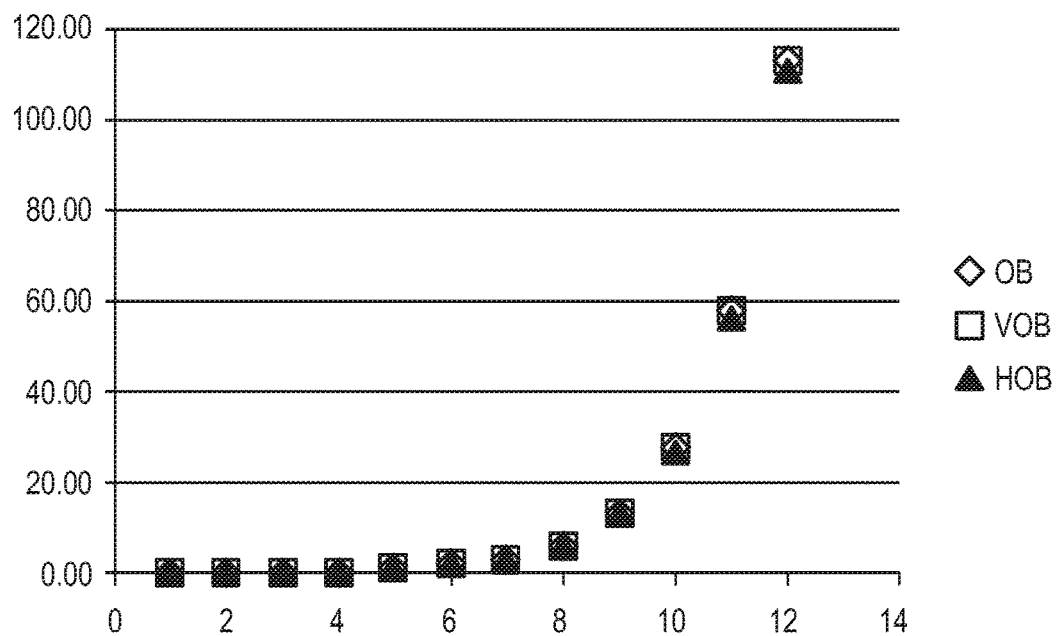
FIG. 5A is a graph depicting a relationship between ISO speed and the standard deviation of pixel values in the OB area.

Here,
$\sigma^2$: variance
$\sigma$: standard deviation
$n$: number of pixels
$x_i$: pixel value of $i^{th}$ pixel
$\mu$: average of all pixels FIG. 5A is a graph depicting a relationship between the ISO speed and the standard deviation of the pixel values in the OB area with respect to raw data obtained by capturing images while changing the ISO speed from 100 to 204800 step-by-step, similar to the example in FIG. 4.

In FIG. 5A, the horizontal axis indicates the step of ISO speed, where "1" corresponds to "ISO speed=100", the value of ISO speed doubles at every step onward, and "12" corresponds to "ISO speed=204800". The vertical axis indicates the ratio of the standard deviation, where the standard deviation at the time when ISO speed=100 is assumed to be 1. "OB" denotes the standard deviation in the entire OB area, "VOB" denotes the standard deviation in the vertical OB area (see VOB area 702 in FIG. 7), and "HOB" denotes the standard deviation in the horizontal OB area (see HOB area 701 in FIG. 7). "OB", "VOB", and "HOB" while assuming the standard deviation at the time when ISO speed=100 to be 1.

Figure 5B:
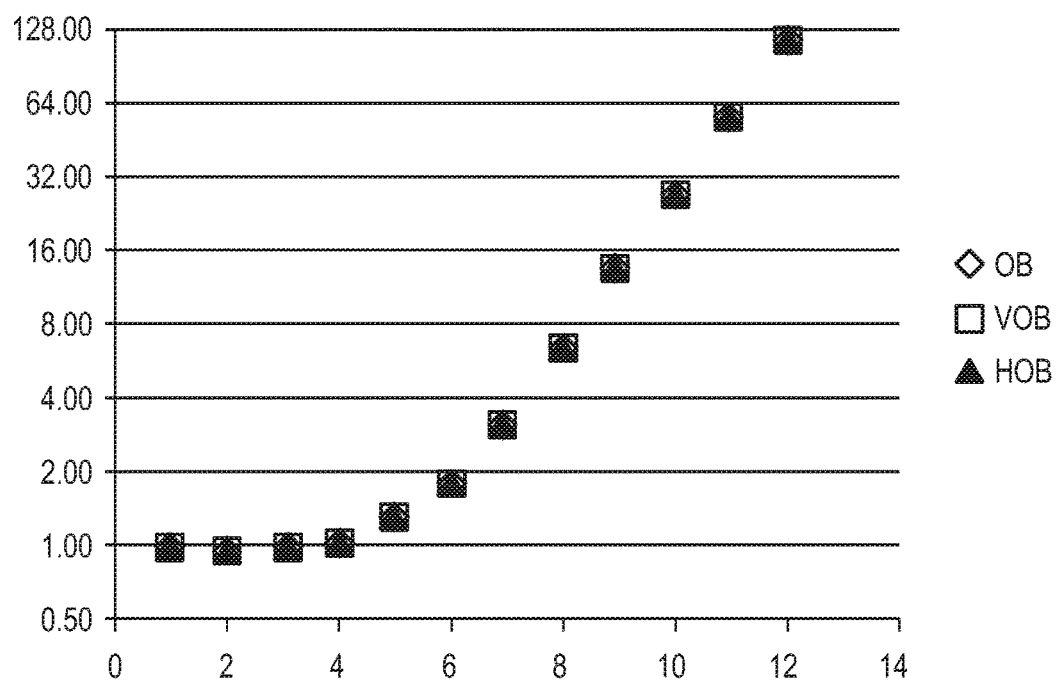
FIG. 5B is a graph in which the vertical axis in FIG. 5A is replaced with a logarithmic scale.

In the example in FIG. 5A, the standard deviation in the OB area is roughly constant when the ISO speed is 100 to 400, and increases roughly as a quadratic function when the ISO speed is 800 or higher. This indicates that the standard deviation increases in association with the amount of noise included in the OB area. Now, the vertical axis in FIG. 5A is replaced with a logarithmic scale, as shown in FIG. 5B. This replacement enables an increase in the standard deviation with an ISO speed of 800 or higher to be comprehended as a linear function, as in the case of FIG. 4. Accordingly, the image capturing apparatus 100 can determine the quantization parameter using the standard deviation in the entire OB area, as in the case of using the amount of generated code in the OB area as the index value of the noise amount. Although the case of using the variance in the OB area is not shown in the diagrams, the image capturing apparatus 100 can determine the quantization parameter using the variance in the entire OB area, as in the case of using the standard deviation. Also, the image capturing apparatus 100 may calculate a standard deviation or a variance in a partial area in the OB area, as in the case of FIG. 4.

Here, although FIG. 3 shows an example in which the noise amount is determined to be one of the three levels, namely "large", "middle", and "small" for simplification of the description, this embodiment is not limited thereto. For example, the image capturing apparatus 100 may calculate the ratio relative to the OB area analysis result (amount of generated code, standard deviation etc.) in the case where the ISO speed is 100, the ratio serving as a weighting coefficient, and add the ratio to the normal quantization parameter, or multiply the normal quantization parameter by this ratio.

Note that the image capturing apparatus 100 may store, in advance, the OB area analysis result in the case where the ISO speed is 100 to serve as a reference, or for example, this OB area analysis result may be acquired when the power is turned on, by capturing an image and analyzing the image, for example.

As described above, according to the first embodiment, the image capturing apparatus 100 estimates the noise amount by analyzing at least a part of the OB area, and encodes the raw data using a quantization parameter corresponding to the estimated noise amount. Thus, it is possible to estimate the noise amount in a captured image with high accuracy, thereby suppressing noise.

Second Embodiment

The first embodiment has described a configuration in which entire raw data is encoded using a quantization parameter that is set based on the index value of the noise amount (amount of generated code in the OB area etc.). The second embodiment will describe a configuration in which, when performing encoding using the quantization parameter that is set based on the index value of the noise amount, an area that was encoded when acquiring the index value of the noise amount is excluded from an encoding target. In the second embodiment, the basic configuration of the image capturing apparatus 100 is the same as that according to the first embodiment (see FIG. 1). The following description will focus mainly on differences from the first embodiment.

Figure 6:
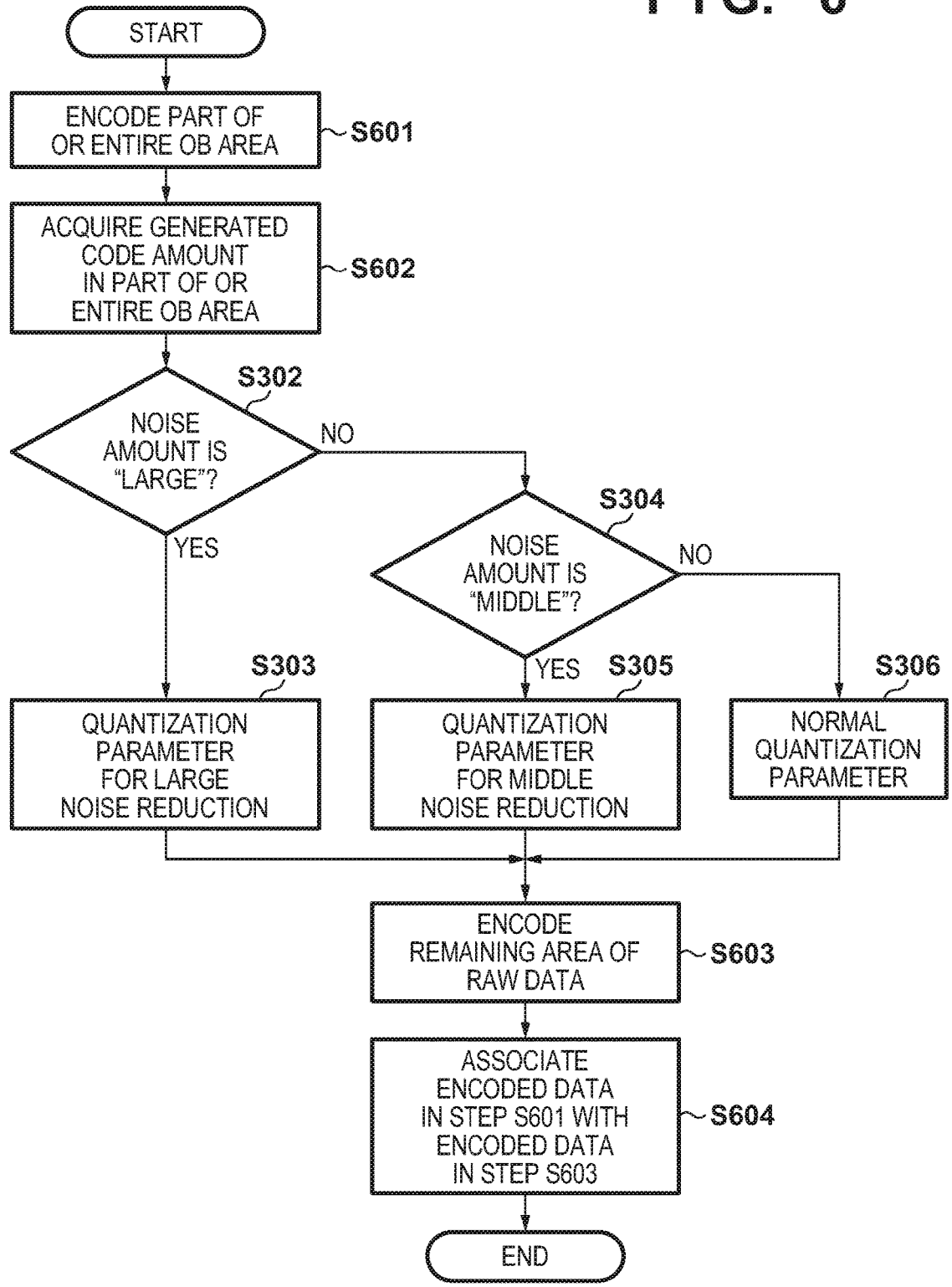
FIG. 6 is a flowchart of encoding processing executed by the image capturing apparatus 100 according to a second embodiment.

FIG. 6 is a flowchart of encoding processing executed by the image capturing apparatus 100. Processing in each step of this flowchart is realized as a result of the control unit 101 executing a control program, unless otherwise stated. In FIG. 6, steps in which the same processing as or similar to that in FIG. 3 is performed will be assigned the same signs. Upon the raw data being generated by the image capturing unit 102, processing of this flowchart starts.

Figure 7:
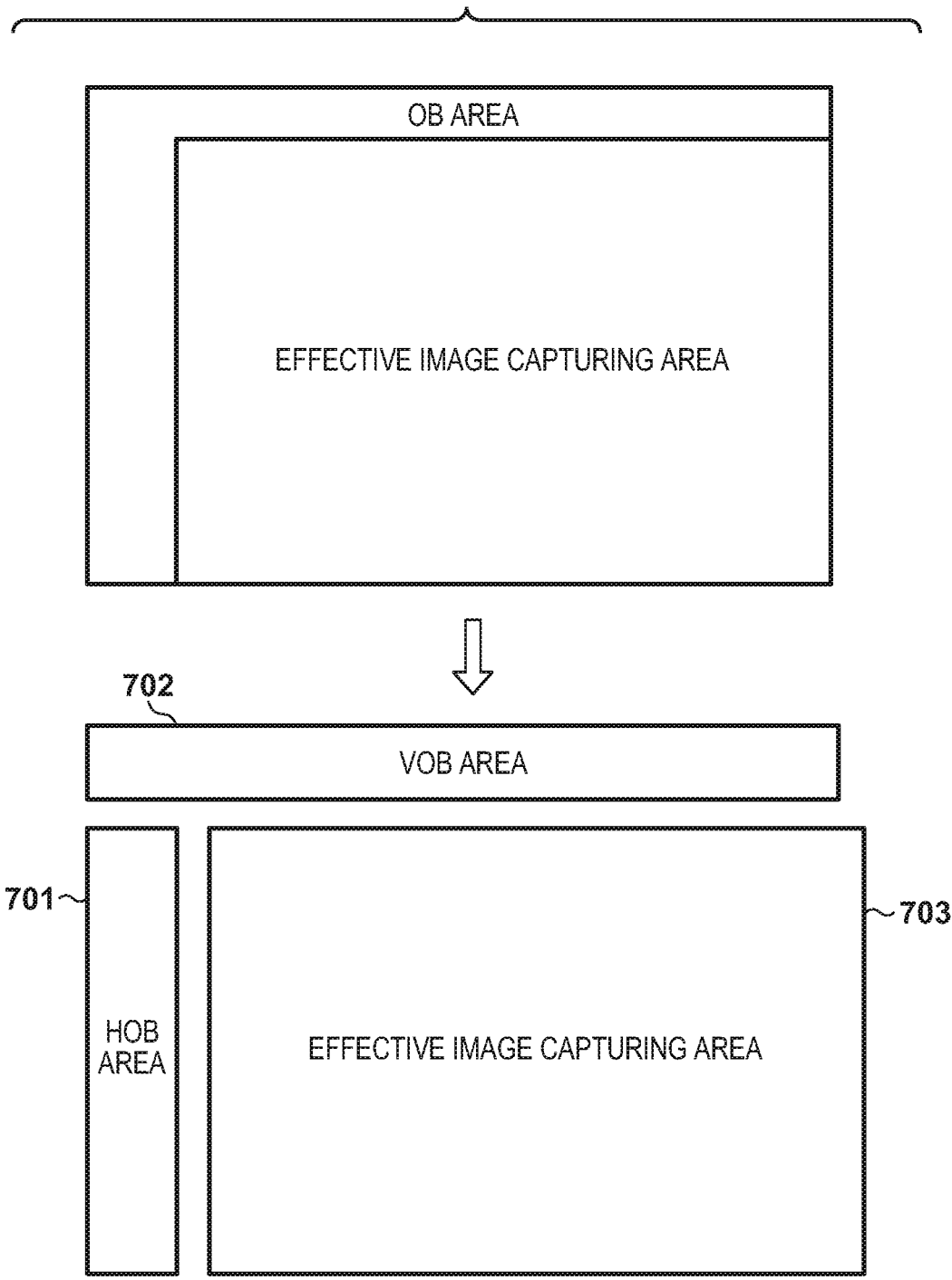
FIG. 7 is a conceptual diagram depicting division of raw data.

In steps S601 and S602, the OB area analysis unit 108 encodes a part of or the entire OB area to acquire the amount of generated code, as described in the first embodiment with reference to step S301 in FIG. 3. For example, as shown in FIG. 7, the OB area analysis unit 108 divides the raw data into the HOB area 701, the VOB area 702, and the effective image capturing area 703, and encodes the HOB area 701 and the VOB area 702 (i.e. the entire OB area) among these areas to acquire the amount of generated code.

In step S603, the raw data encoding unit 105 encodes the remaining area (area excluding the encoded area in step S601) of the raw data, using the quantization parameter that was set in step S303, S305, or S306. For example, in the case where the entire OB area is encoded in step S601 as described with reference to FIG. 7, the remaining area corresponds to the effective image capturing area 703.

In step S604, the control unit 101 associates the encoded data generated in step S603 with the encoded data generated in step S601. Thus, the encoded data corresponding to the entire raw data is obtained as a set of data.

In the first embodiment, in the case of using the amount of generated code as the index value of the noise amount, encoding is performed twice (steps S301 and S307 in FIG. 3) for at least a part of the OB area. In contrast, in the second embodiment, encoding is not performed in step S603 on the area that was encoded in step S601. Thus, the processing load is reduced.

Third Embodiment

The third embodiment will describe a configuration that is the same as the configuration according to the first embodiment, and in which, additionally, OB area analysis is omitted depending on image capturing conditions. In the third embodiment, the basic configuration of the image capturing apparatus 100 is the same as that according to the first embodiment (see FIG. 1). The following description will focus mainly on differences from the first embodiment.

FIG. 8 is a flowchart of encoding processing executed by the image capturing apparatus 100. Processing in each step of this flowchart is realized as a result of the control unit 101 executing a control program, unless otherwise stated. In FIG. 8, steps in which the same processing as or similar to that in FIG. 3 is performed will be assigned the same signs. Upon the raw data being generated by the image capturing unit 102, processing of this flowchart starts.

In step S801, the control unit 101 acquires image capturing conditions at the time when the raw data was captured. The image capturing conditions to be acquired are those that affect the noise amount in the raw data, and include ISO speed and exposure time, for example.

In step S802, the control unit 101 determines whether the image capturing conditions acquired in step S801 are image capturing conditions under which the noise amount needs to be estimated. Image capturing conditions under which the noise amount needs to be estimated are image capturing conditions under which the noise amount in the raw data is predicted to be large to some extent, and are determined based on the characteristics of the image capturing unit 102, for example. Accordingly, in the case of the image capturing conditions under which the noise amount needs to be estimated, the noise amount in the raw data is predicted to be large compared with the case of image capturing conditions under which the noise amount does not need to be estimated. Processing proceeds to step S301 if the acquired image capturing conditions are those under which the noise amount needs to be estimated, and the processing proceeds to step S306 if not. Accordingly, in the case of image capturing conditions under which the noise amount does not need to be estimated, the same quantization parameter as that used in the case of a small noise amount is used.

Thus, in the case of image capturing conditions under which the noise amount in the raw data is predicted to be small to some extent, OB area analysis is omitted, reducing the processing load.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-110222, filed Jun. 1, 2016, which is hereby incorporated by reference herein in its entirety.

What is claimed is:

1. An encoding apparatus comprising:
a processor and a memory storing a program configured to execute:
acquiring an index value of a noise amount by analyzing at least a part of an optical black area that is included in raw data;
quantizing the raw data based on the index value; and
encoding the quantized raw data,
wherein the raw data includes a first area having at least a part of the optical black area, and a second area that does not include the optical black area,
wherein the acquiring acquires the index value based on a code amount of encoded data generated by encoding the raw data in the first area, and
wherein if the index value is a first value, the quantizing quantizes the raw data in the second area with a first quantization step, and if the index value is a second value corresponding to a larger noise amount than a noise amount in a case where the index value is the first value, the quantizing quantizes the raw data in the second area with a second quantization step that is larger than the first quantization step.

2. The encoding apparatus according to claim 1, further comprising:
subjecting the raw data to frequency transform,
wherein the quantizing quantizes data obtained by performing frequency transform.

3. The encoding apparatus according to claim 2,
wherein if the index value is the first value, the quantizing quantizes a high-frequency component of the raw data with the first quantization step, and if the index value is the second value, the quantizing quantizes the high-frequency component of the raw data with the second quantization step.

4. The encoding apparatus according to claim 3,
wherein the quantizing quantizes low-frequency component data in the raw data with a same quantization step, regardless of the index value.

5. The encoding apparatus according to claim 1,
wherein the acquiring acquires, as the index value, a code amount of encoded data generated by quantizing and encoding at least a part of the optical black area in a frequency domain.

6. The encoding apparatus according to claim 1,
wherein the acquiring performs the analysis if an image capturing condition for the raw data is a second image capturing condition under which a noise amount is predicted to be larger than a noise amount under a first image capturing condition.

7. The encoding apparatus according to claim 6,
wherein the quantizing quantizes the raw data with the first quantization step if the image capturing condition for the raw data is the first image capturing condition.

8. The encoding apparatus according to claim 1,
wherein the first area is an entire area of the optical black area, and the second area is an effective image capturing area included in the raw data.

9. The encoding apparatus according to claim 1, further comprising an image capturing device that obtains the raw data by capturing a subject.

10. An encoding method comprising:
acquiring an index value of a noise amount by analyzing at least a part of an optical black area that is included in raw data;
quantizing the raw data based on the index value; and
encoding the quantized raw data,
wherein the raw data includes a first area having at least a part of the optical black area, and a second area that does not include the optical black area,
wherein the acquiring unit acquires the index value based on a code amount of encoded data generated by encoding the raw data in the first area, and
wherein if the index value is a first value, the raw data in the second area is quantized with a first quantization step in the quantizing, and if the index value is a second value corresponding to a larger noise amount than a noise amount in a case where the index value is the first value, the raw data in the second area is quantized with a second quantization step that is larger than the first quantization step in the quantizing.

11. A non-transitory computer-readable storage medium which stores a program for causing a computer to execute an encoding method, the program comprising code to execute:
acquiring an index value of a noise amount by analyzing at least a part of an optical black area that is included in raw data;
quantizing the raw data based on the index value; and
encoding the quantized raw data,
wherein the raw data includes a first area having at least a part of the optical black area, and a second area that does not include the optical black area,
wherein the acquiring unit acquires the index value based on a code amount of encoded data generated by encoding the raw data in the first area, and
wherein if the index value is a first value, the raw data in the second area is quantized with a first quantization step in the quantizing, and if the index value is a second value corresponding to a larger noise amount than a noise amount in a case where the index value is the first value, the raw data in the second area is quantized with a second quantization step that is larger than the first quantization step in the quantizing.

12. An encoding apparatus comprising:
a processor and a memory storing a program configured to execute:
acquiring an index value of a noise amount by analyzing at least a part of an optical black area that is included in raw data;
quantizing the raw data based on the index value; and
encoding the quantized raw data,
wherein the raw data includes a first area having at least a part of the optical black area, and a second area that does not include the optical black area,
wherein the acquiring acquires the index value based on a variance or a standard deviation of pixel values in the first area, and
wherein if the index value is a first value, the quantizing quantizes the raw data in the second area with a first quantization step, and if the index value is a second value corresponding to a larger noise amount than a noise amount in a case where the index value is the first value, the quantizing quantizes the raw data in the second area with a second quantization step that is larger than the first quantization step.

13. A method for an encoding apparatus comprising:
acquiring an index value of a noise amount by analyzing at least a part of an optical black area that is included in raw data;
quantizing the raw data based on the index value; and
encoding the quantized raw data,
wherein the raw data includes a first area having at least a part of the optical black area, and a second area that does not include the optical black area,
wherein the index value is acquired based on a variance or a standard deviation of pixel values in the first area, and
wherein if the index value is a first value, the quantizing quantizes the raw data in the second area with a first quantization step, and if the index value is a second value corresponding to a larger noise amount than a noise amount in a case where the index value is the first value, the quantizing quantizes the raw data in the second area with a second quantization step that is larger than the first quantization step.

14. A non-transitory computer-readable storage medium which stores a program for causing a computer to execute an encoding method, the program comprising code to execute:
acquiring an index value of a noise amount by analyzing at least a part of an optical black area that is included in raw data;
quantizing the raw data based on the index value; and
encoding the quantized raw data,
wherein the raw data includes a first area having at least a part of the optical black area, and a second area that does not include the optical black area,
wherein the index value is acquired based on a variance or a standard deviation of pixel values in the first area, and
wherein if the index value is a first value, the quantizing quantizes the raw data in the second area with a first quantization step, and if the index value is a second value corresponding to a larger noise amount than a noise amount in a case where the index value is the first value, the quantizing quantizes the raw data in the second area with a second quantization step that is larger than the first quantization step.

* * * * *